(12) United States Patent
Lepp et al.

(10) Patent No.: US 11,910,193 B2
(45) Date of Patent: *Feb. 20, 2024

(54) METHODS AND SYSTEMS FOR SEGMENTING COMPUTING DEVICES IN A NETWORK

(71) Applicant: BlackBerry Limited, Waterloo (CA)

(72) Inventors: James Randolph Winter Lepp, Ottawa (CA); Stephen McCann, Southampton (GB); Michael Peter Montemurro, Toronto (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,535

(22) Filed: Aug. 16, 2022

(65) Prior Publication Data

US 2022/0394474 A1    Dec. 8, 2022

Related U.S. Application Data

(63) Continuation of application No. 16/781,305, filed on Feb. 4, 2020, now Pat. No. 11,451,960.

(51) Int. Cl.
| | |
|---|---|
| *H04L 29/06* | (2006.01) |
| *H04W 12/084* | (2021.01) |
| *H04W 76/11* | (2018.01) |
| *H04L 9/30* | (2006.01) |
| *H04L 12/46* | (2006.01) |
| *H04L 9/40* | (2022.01) |

(52) U.S. Cl.
CPC ............. *H04W 12/084* (2021.01); *H04L 9/30* (2013.01); *H04L 12/4641* (2013.01); *H04L 63/0823* (2013.01); *H04L 63/20* (2013.01); *H04W 76/11* (2018.02)

(58) Field of Classification Search
CPC ....... H04W 12/084; H04W 76/11; H04L 9/30; H04L 12/4641; H04L 63/0823; H04L 63/20
See application file for complete search history.

(56) References Cited

U.S. PATENT DOCUMENTS

| | | | | |
|---|---|---|---|---|
| 10,728,807 | B1* | 7/2020 | Kumar | .................. H04L 9/0891 |
| 2012/0195318 | A1* | 8/2012 | Numata | .............. H04L 41/0895 |
| | | | | 370/392 |
| 2019/0207948 | A1* | 7/2019 | Mallis | .................. H04L 63/0876 |
| 2019/0349880 | A1* | 11/2019 | Serrano | .................. H04W 12/06 |

* cited by examiner

*Primary Examiner* — Evans Desrosiers
(74) *Attorney, Agent, or Firm* — Rowand LLP (57) ABSTRACT

Methods and systems of segmenting computing devices in a wireless network having an access point broadcasting in a single domain are described. In an exemplary method, a request to join the wireless network is received from a computing device. The request is associated with an identifier. When the identifier is not associated with a virtual network within the wireless network, a virtual network is configured within the wireless network and the identifier is associated thereto and the computing device is assigned thereto. When the identifier is associated with an existing virtual network within the wireless network, the computing device is assigned to the existing virtual network.

18 Claims, 9 Drawing Sheets

METHODS AND SYSTEMS FOR SEGMENTING COMPUTING DEVICES IN A NETWORK

CROSS-REFERENCE TO RELATED APPLICATIONS

This application is a continuation of U.S. patent application Ser. No. 16/781,305 filed on Feb. 4, 2020, the entire contents of which are incorporated herein by reference.

FIELD

The present application generally relates to network security, and more particularly, to segmenting computing devices in a network.

BACKGROUND

Computing devices often request access to a network. In bring-your-own device (BYOD) environments connecting computing devices having different trust levels to a network may pose a risk to the network or to the other computing devices.

It would be advantageous to be able to segment computing devices in a network.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In an aspect, the present application describes a method of segmenting computing devices in a wireless network having an access point broadcasting in a single broadcast domain, the method comprising receiving, from a computing device, a request to join the wireless network, the request associated with an identifier; when the identifier is not associated with a virtual network within the wireless network: configuring a virtual network within the wireless network and associating the identifier thereto; and assigning the computing device to the configured virtual network; and when the identifier is associated with an existing virtual network within the wireless network: assigning the computing device to the existing virtual network.

In one or more embodiments, the method comprises when the assigned computing device leaves the wireless network, removing the assigned computing device from the virtual network.

In one or more embodiments, the method comprises when the assigned computing device leaving the wireless network is the last computing device within the virtual network, deleting the virtual network.

In one or more embodiments, computing devices within the virtual network have at least one of unrestricted communication with one another and unlimited access to one another.

In one or more embodiments, the identifier is at least one of a username, a password, a group name, a group password, a digital certificate, a hardware token, a subscriber identification module, a public key and an attribute associated with a certificate.

In one or more embodiments, the method comprises providing a network level service to the virtual network via at least one of an instance of the network level service configured within the virtual network and tunneled access to the network level service.

In one or more embodiments, the network level service is one of e-mail, instant messaging, media streaming, voice communication, application program data, vehicle-related data, traffic and road conditions, and emergency information.

In one or more embodiments, each virtual network within the wireless network comprises a broadcast domain enforcement layer such that a computing device assigned to the virtual network can access only other computing devices assigned to the same virtual network.

In one or more embodiments, each virtual network within the wireless network comprises an internet protocol broadcast domain enforcement layer such that when an internet protocol packet is received and includes an address outside the virtual network, the internet protocol packet is transmitted to the address outside the virtual network.

In one or more embodiments, each virtual network within the wireless network comprises at least one of a network level service and a firewall layer, wherein the at least one of the network level service and the firewall layer are configured to be recognized and accessed by the assigned computing device as another computing device assigned to the virtual network.

In another aspect, the present application describes a server associated with a wireless network having an access point broadcasting in a single broadcast domain, the server comprising a processor; a memory; and processor-executable instructions that, when executed by the processor, cause the processor to receive, from a computing device, a request to join the wireless network, the request associated with an identifier; when the identifier is not associated with a virtual network within the wireless network: configure a virtual network within the wireless network and associate the identifier thereto; and assign the computing device to the configured virtual network; and when the identifier is associated with an existing virtual network within the wireless network: assign the computing device to the existing virtual network.

In one or more embodiments, the processor-executable instructions, when executed by the processor, further cause the processor to: when the assigned computing device leaves the wireless network, remove the assigned computing device from the virtual network.

In one or more embodiments, the processor-executable instructions, when executed by the processor, further cause the processor to: when the assigned computing device leaving the wireless network is the last computing device within the virtual network, delete the virtual network.

In one or more embodiments, computing devices within the virtual network have at least one of unrestricted communication with one another and unlimited access to one another.

In one or more embodiments, the identifier is at least one of a username, a password, a group name, a group password, a digital certificate, a hardware token, a subscriber identification module, a public key and an attribute associated with a certificate.

In one or more embodiments, the processor-executable instructions, when executed by the processor, further cause the processor to: provide a network level service to the virtual network via at least one of an instance of the network level service configured within the virtual network and tunneled access to the network level service.

In one or more embodiments, each virtual network within the wireless network comprises a broadcast domain enforcement layer such that a computing device assigned to the virtual network can access only other computing devices assigned to the same virtual network.

In one or more embodiments, each virtual network within the wireless network comprises an internet protocol broadcast domain enforcement layer such that when an internet protocol packet is received and includes an address outside the virtual network, the internet protocol packet is transmitted to the address outside the virtual network.

In one or more embodiments, each virtual network within the wireless network comprises at least one of a network level service and a firewall layer, wherein the at least one of the network level service and the firewall layer are configured to be recognized and accessed by the assigned computing device as another computing device assigned to the virtual network.

In another aspect, the present application describes a non-transitory computer readable medium having stored thereon processor-executable instructions that, when executed by the processor, cause the processor to receive, from a computing device, a request to join a wireless network having an access point broadcasting in a single broadcast domain, the request associated with an identifier; when the identifier is not associated with a virtual network within the wireless network: configure a virtual network within the wireless network and associate the identifier thereto; and assign the computing device to the configured virtual network; and when the identifier is associated with an existing virtual network within the wireless network: assign the computing device to the existing virtual network.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

Many organizations have gravitated to a bring-your-own-device (BYOD) model for staff computing devices. To facilitate this model, many organizations provide an enterprise network such as a Wireless Local Area Network (WLAN) that connects various computing devices to form a Local Area Network (LAN). Security mechanisms that regulate access and traffic within the enterprise network such as for example a firewall are often provided around the enterprise network.

In a WLAN, a computing device may connect to the network through a wireless access point (AP). A wireless AP (or more simply, an AP) can refer to a communication device to which a computing device can establish a wired or wireless connection to a network or to communicate with other endpoint devices. WLANs can include wireless networks that operate according to the Institute of Electrical and Electronic Engineers (IEEE) 802.11 or Wi-Fi Alliance Specifications such as for example Wi-Fi Protected Access 2 (WPA2) or Wi-Fi Protected Access 3 (WPA3).

Examples of computing devices include computers (e.g., tablet computers, notebook computers, desktop computers, etc.), handheld devices (e.g. smart phones, personal digital assistants, head-mounted device, etc.), wearable devices (smart watches, electronic eyeglasses, head-mounted devices, etc.), game appliances, health monitors, Internet of Things (IoT) devices, or other types of endpoint or user devices that are able to communicate through a wired or wireless connection. Computing devices can include mobile devices and/or fixed position devices.

When a computing device requests connection to a network, an authentication method may be performed. The authentication method may be in accordance with the Extensible Authentication Protocol (EAP) method or the Simultaneous Authentication of Equals (SAE) method. During authentication, a user of the computing device may be required to enter a username, password and/or other identifier.

Figure 1:
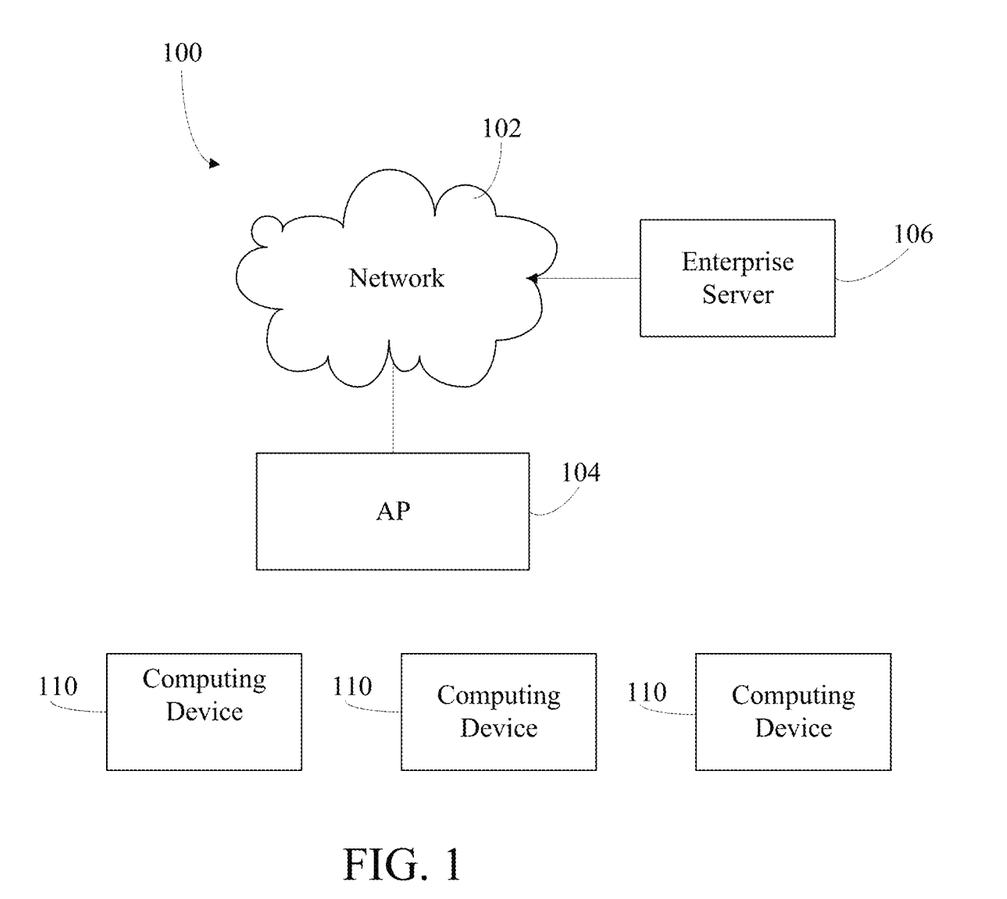
FIG. 1 shows an example system in which methods and devices in accordance with the present description may be implemented.

Turning now to FIG. 1, a system is shown and is generally identified by reference numeral 100. The system 100 comprises a network 102 and an access point (AP) 104.

In this embodiment, the network 102 is an enterprise network that comprises an enterprise server 106. It will be appreciated that the network 102 may be a home or public network that comprises a home server, an external server and/or a public server.

In this embodiment, the enterprise server 106 is programmed to associate the network 102 with a single service set identifier (SSID). It will be appreciated that other network identifiers may be used such as for example a realm or Public Land Mobile Network (PLMN) identifier.

The AP 104 allows computing devices 110 to join the network 102 via wireless communication.

Figure 2:
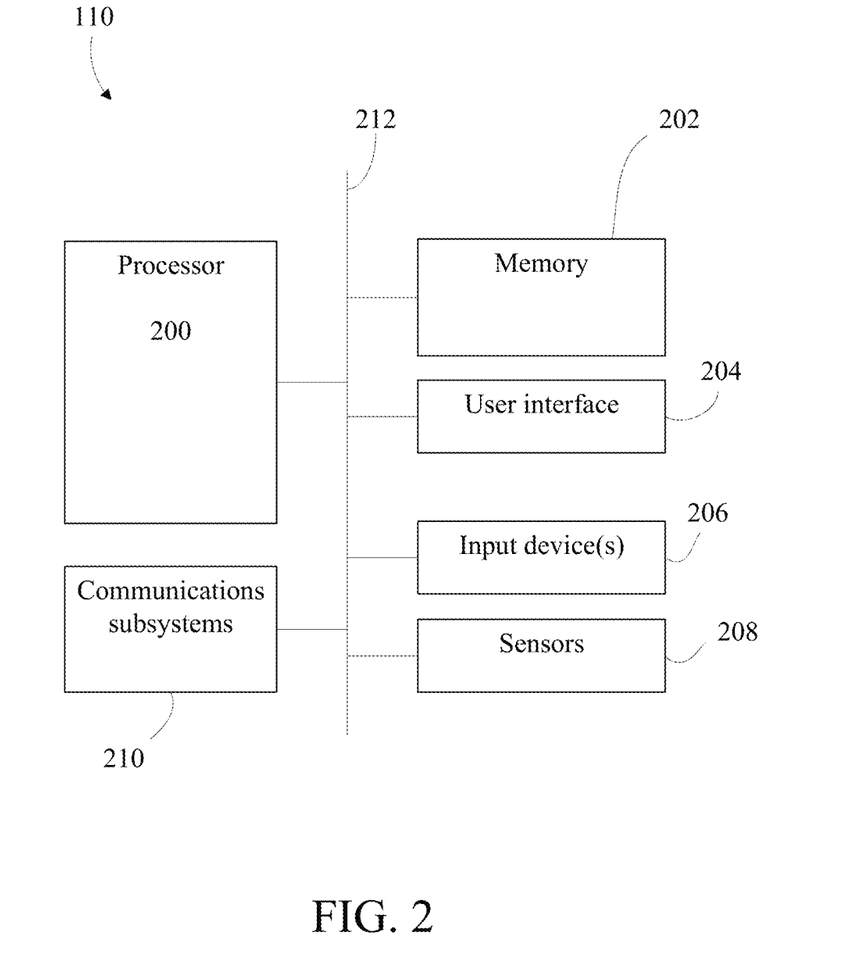
FIG. 2 shows, in block diagram form, a simplified example of a computing device.

An exemplary computing device 110 is shown in FIG. 2. As can be seen, the computing device 110 includes a processor 200, memory 202, a user interface 204, one or more input devices 206, sensor 208, communication subsystems 210 and a bus 212 coupling the various components together. The memory 202 may include temporary memory and persistent memory. The user interface 204 may include a display screen in many embodiments, but may also include other sensory output devices including a speaker, vibratory mechanism, e-ink display, or other such devices. The input devices 206 and sensors 208 may include a touch-sensitive input device like a touchscreen, a keyboard, a keypad, a camera, a microphone, a gyroscope, an accelerometer, and various other input mechanisms. The communications subsystems 210 enable wired or wireless communication with other computing devices. Example communication subsystems 210 include a cellular system for data and/or voice communication over a cellular network, including 3G, 4G or 5G networks, a Wi-Fi chip for data connection with a wireless local area network (WLAN), a short-range wireless system like a Bluetooth™ chip, a near-field communications (NFC) chip, an Ethernet port, or any other communications systems operating in accordance with any applicable communications protocol. As will be appreciated, the computing device may be a computing device owned by the enterprise or owned by a staff member of the enterprise and associated through a BYOD program. The computing device may be a computer (e.g., tablet computer, notebook computer, desktop computer, etc.), a handheld device (e.g. smart phone, personal digital assistant, head-mounted device, etc.), a wearable device (smart watch, electronic eyeglasses, head-mounted device, etc.), a game appliance, a health monitor, an Internet of Things (IoT) device, or other type of endpoint or user device that communicates through a wired or wireless connection. The computing device may be a user or enterprise owned device within a home or public environment.

When a user of a computing device 110 would like to join a network such as a Wi-Fi network, the computing device 110 may be configured to provide a list of available Wi-Fi networks to the user. Each Wi-Fi network may be provided with a SSID or other identifier such as for example a realm or Public Land Mobile Network (PLMN) identifier. The user may select one of the Wi-Fi networks to connect to and the request may be communicated wirelessly to a server of the network. As mentioned previously, this may be done in accordance with IEEE 802.11 or Wi-Fi Alliance Specifications or other known protocols.

When a computing device 110 requests connection to or association with the network 102, the enterprise server 106 requests authentication from the computing device 110. During authentication, the computing device 110 provides an identifier to the enterprise server 106 (through AP 104). As will be described in more detail below, the enterprise server 106 executes a method wherein the identifier is used to segment computing devices 110 connected to the network 102 such that all computing devices 110 having the same identifier are connected to one another within a virtual network.

Each virtual network is configured such that all computing devices 110 within the virtual network have traditional LAN unlimited access to one another. Further, each virtual network is configured such that computing devices 110 inside the virtual network have full or unlimited access to one another while being isolated from devices within other virtual networks.

Figure 3:
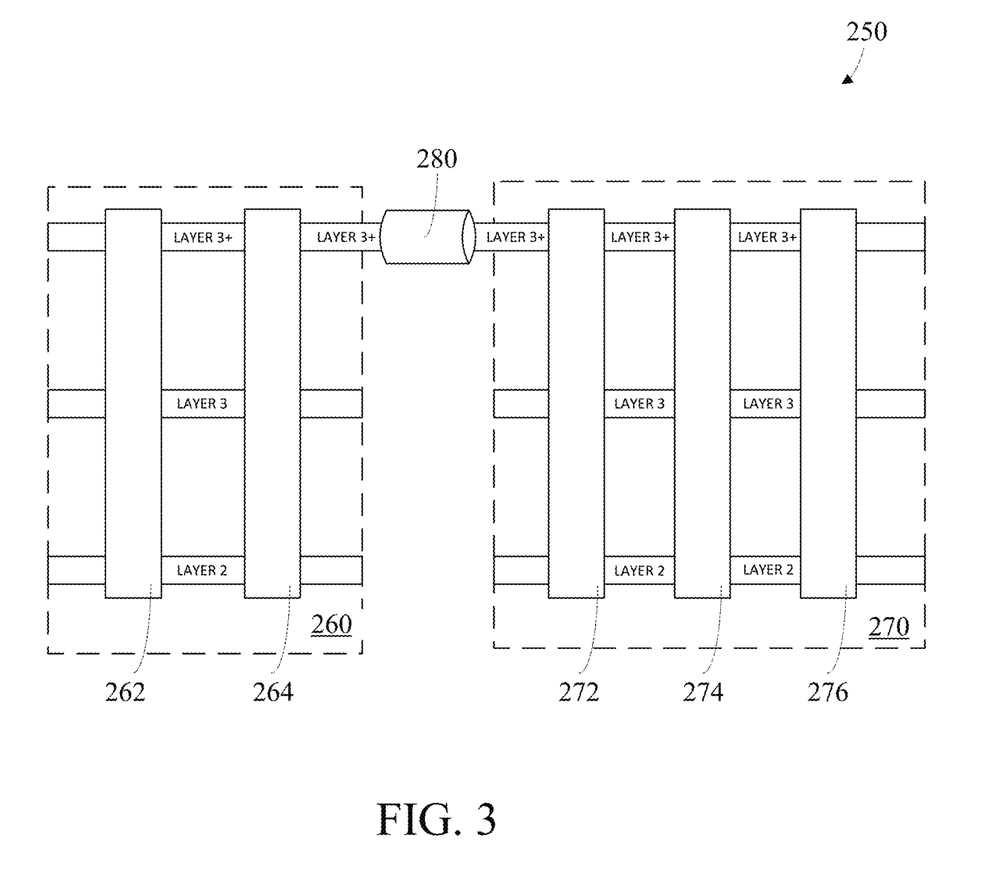
FIG. 3 shows, in a schematic diagram, a visual representation of layers of exemplary virtual networks.

A schematic diagram 250 showing a visual representation of layers used to protect, monitor and secure virtual networks 260 and 270 is shown in FIG. 3. Each computing device is represented by a network interface showing the interconnection of the lower Open Systems Interconnection (OSI) networking layers. In this example, virtual network 260 comprises computing devices 262 and 264 and virtual network 270 comprises computing devices 272, 274 and 276. Computing devices 262, 264, 272, 274, 276 are of the same type as computing device 100 described above.

In this example, the virtual networks 260 and 270 are configured such that three abstraction layers exist, namely Layer 2, Layer 3 and Layer 3+. At Layer 2, a Layer 2 broadcast domain is enforced. Layer 2 limits each virtual network 260, 270 such that only devices connected within that particular virtual network can access one another. As shown in FIG. 3, within virtual network 260, computing devices 262 and 264 have access to one another at Layer 2. Similarly, within virtual network 270, computing devices 272, 274 and 276 have access to one another at Layer 2.

As mentioned previously, each computing device may be wired or wireless. For wireless computing devices, the Layer 2 security may be controlled using different Group Temporal Key (GTK) or Multicast Group Temporal Key (MGTK) for different virtual networks. An example of using MGTK is described in U.S. patent application Ser. No. 16/242,798 entitled "Controlling Transmission of Group-Addressed Data." For example, in accordance with IEEE 802.11-2016, the AP 106 may distribute a GTK having a key identifier (Key ID) of 0 or 1 and this may be applied to all group-addressed data.

As another example, when MGTK's are used, multiple group temporal keys may be used for different streams of group-addressed data, different groups of wireless devices or for each virtual network. As will be appreciated, one or more MGTK's may be defined. The IEEE 801.11-2016 may be referred to as a Broadcast GTK (BGTK).

To enable MGTK, one or more new Authentication and Key Managements (AKMs) may be defined that support BGTK and MGTK. Support for the one or more new AKMs may be negotiated between the AP 104 and the computing devices 110 during the association process. When using the new AKM (instead of a previously-defined AKM) a larger number of Key IDs may be enabled.

In this example, the AP 104 maintains a mapping between the MGTK, a group-addressed stream, and a group of computing devices subscribed to the group-addressed stream. Each group of computing devices may be computing devices within a particular virtual network. Each group of computing devices (referred to as an "MGTK group") that employ a particular MGTK is assigned a respective identifier (referred to as an "MGTK identifier"). Different groups of computing devices that employ respective different MGTKs are assigned different identifiers. As will be appreciated, each virtual network may employ a different MGTK and may be assigned a different identifier The AP 104 may advise one or more group-addressed streams in beacons, probe responses, or other messages of information elements. This advertisement includes information about the MGTK to use for each stream.

After a computing device has subscribed to a group-addressed stream, the AP 104 assigns the computing device to an MGTK group and transmits the MGTK to the computing device in a GTK handshake exchange.

The AP 104 and the computing device 100 can each advertise support for MGTK. For example, support for MGTK can be advertised as a service or an element in an access network query protocol (ANQP) message or other type of message.

When the computing device 100 associates with the AP 104, the computing device 100 and the AP 104 negotiate support for MGTK, such as by using a 4-way handshake. For example, the negotiated MGTK can be indicated in a capability bit in a Robust Security Network Element (RSNE) in an association.

For wired computing devices, Layer 2 security may be controlled using IEEE 802.1Q VLANs. Each computing device is identified at Layer 2 using a Medium Access Control (MAC) address.

At Layer 3, an IP broadcast domain is enforced. The bounds of each virtual network are controlled at Layer 3 via IP routing into and out of the virtual network. In this example, each virtual network comprises a gateway and DHCP server that are stored at the enterprise server 106. In this example, since the DHCP server is centralized at the enterprise server 106, a DHCP relay may be used. Each time a computing device joins a virtual network, the gateway IP address is communicated to the computing device.

At Layer 3, IP packets may be freely exchanged between devices of the virtual network. Anything to be transmitted outside of the virtual network must be sent to the gateway IP address to be routed (for example to another virtual network or other external network). In this example, to limit the usage of the IP address space, each virtual network may make use of Network Address Translation (NAT).

At Layer 3+, a firewall is used to control traffic into and out of the virtual network. Put another way, each virtual network comprises a firewall that controls traffic into and out of the virtual network. The firewall may be based on IP, port, protocol, stateful, deep packet inspection, etc. The firewall is configured such that it is recognized within the virtual network as a device at Layer 2 and Layer 3. As such, the firewall is reachable by all computing devices connected within the virtual network. The firewall may permit some traffic or communication between its virtual network and one or more other virtual networks.

In this example, each virtual network requires an independent Address Resolution Protocol (ARP) table configured to log and track IP addresses and MAC addresses of all computing devices within the virtual network. In this example, an ARP table for each virtual network is stored at the enterprise server 106.

As will be appreciated, each virtual network may require or request access to a particular server or service. For example, all virtual networks may require or request access to an email server associated with the network. In this example, the email server may be accessed at Layer 2, Layer 3 or Layer 3+. At Layer 2, the email server may be placed virtually within each virtual network requesting access thereto. As such, the email server may be recognized within the virtual network as a device and as a result all computing devices within the virtual network may have access to the email server. At Layer 3, Virtual Private Networks (VPNs) and routing may be used to enable access from the virtual network to the email server. At Layer 3+, the firewall may be configured to enable access to the server from the virtual network. For example, SSL tunneling may be used. Examples of servers or services that may be accessed by each virtual network are email, instant messaging, media streaming, voice communication, application program data, vehicle-related data, traffic and road conditions, and emergency information.

In the example shown in FIG. 3, the limiting of Layer 2 shuts down traffic flow out of the virtual network. The router/firewall rules set by Layer 3 and Layer 3+ enable selective traffic to flow between virtual networks or to external networks. A computing device joining a virtual network, based on an identifier, may be configured automatically based on the security mechanism described above.

As mentioned, security mechanisms such as for example a firewall monitor protect a virtual network and monitor the ingress and egress of data to and from the virtual network, respectively. As will be appreciated, additional or alternative security mechanisms may be used. For example, a firewall between the virtual network and external resources such as for example the Internet or a cloud-based server may be used. A firewall between the virtual network and internal (enterprise) resources such as for example corporate/enterprise servers or a cloud-based corporate/enterprise server may be used. As an example, a firewall may allow every virtual network to access an internal server such as a mail server or a phone server but would prevent virtual networks from accessing one another. As another example, a cloud-based private server may be reached by setting up a VPN between a virtual network and the cloud server. Each virtual network may be a dynamically created virtual LAN (VLAN). In this example, the AP 104 basic service set (identified by the SSID) may be used to support multiple dynamically created VLANs. The dynamically created VLANs may span across multiple APs that advertise the same SSID, and are controlled using the same server.

As an example, a device of a virtual network may be permitted to cast video to another device in the same virtual network, but would not be permitted to cast video to a device in another virtual network (even if connected to the same AP). In this example, all devices connected to the network (through the same AP or different APs) may all be permitted to access the internet.

Figure 4:
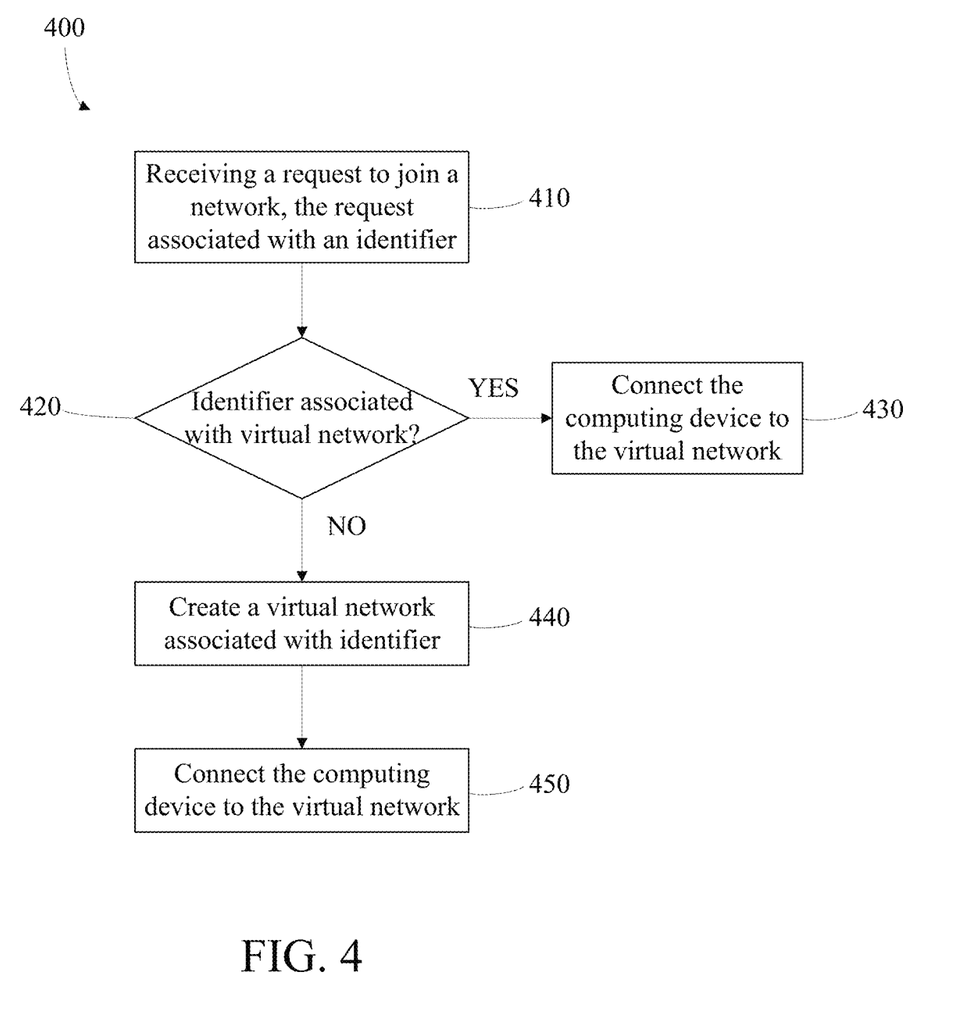
FIG. 4 shows, in flowchart form, one example method for segmenting computing devices in a network.

An exemplary method for segmenting computing devices 110 in the network 102 is shown in FIG. 4 and is generally identified by reference numeral 300. As will be appreciated, the method 400 may be implemented through processor-executable instructions that, when executed by one or more processors associated with the enterprise server 106, cause the processors to carry out the described operations. It will be appreciated that the enterprise server 106 communicates with the computing device 110 through AP 104.

The method 400 begins when a request is received from a computing device 110 to join the network 102 (step 410). When the request is received from the computing device 110, the enterprise server 106 requests authentication of the computing device 110. In this embodiment, the enterprise server 106 communicates a request for the identity associated with the computing device 110. The computing device 110 may use stored credential information, or may prompt the user for credentials to prove its identity, and may request the network to prove its identity. In this embodiment, the Extensible Authentication Protocol (EAP) may be used and as such the computing device 110 prompts the user to enter a username and a password, and validates a certificate credential associated with the enterprise server. In this embodiment, the username is set as an identifier of the computing device 110 and the identifier is associated with the request.

A check is performed to determine if the identifier is associated with a virtual network (step 420). If the identifier is associated with an existing virtual network, the computing device 110 is connected to the existing virtual network (step 430). As mentioned previously, each virtual network requires an ARP table configured to log and track IP addresses and MAC addresses of all computing devices within the virtual network. As such, the IP address and the MAC address of the computing device 110 are added to the ARP table associated with the virtual network.

If, during step 420, it is determined that the identifier is not associated with an existing virtual network, the enterprise server 106 creates a virtual network associated with the identifier (step 440) and the computing device 110 is connected to the virtual network (step 450). Upon creation of the virtual network, an ARP table for the virtual network is created. The IP address and the MAC address of the computing device 110 are added to the ARP table associated with the virtual network.

Examples of segmenting computing devices connected to network 102 using method 400 will now be described. In the example, each computing device may be of the same type as computing device 110 (described above).

Figure 5:
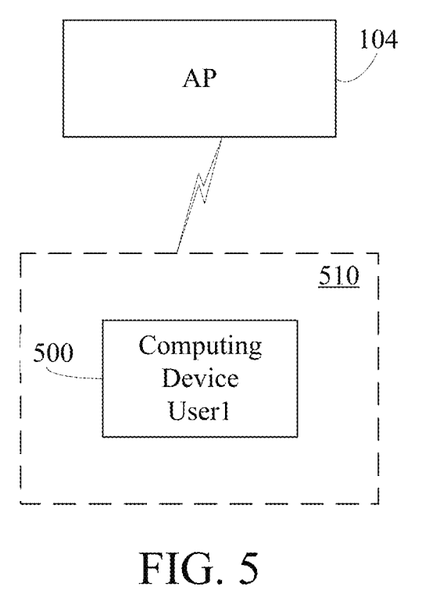
FIG. 5 shows an example of segmented computing devices according to the method of FIG. 4.

In FIG. 5, a computing device 500 requests access to the network 102 via AP 104 (step 410) and the user provides username "USER1" as the identifier. It is determined that the identifier "USER1" is not associated with an existing virtual network (step 420). As such, virtual network 510 is created (step 440) and the computing device 500 is connected thereto (step 450). Although not shown, an ARP table is created by the server 106 for virtual network 510 and the IP address and the MAC address of the computing device 500 are added to the ARP table associated with virtual network 510.

Figure 6:
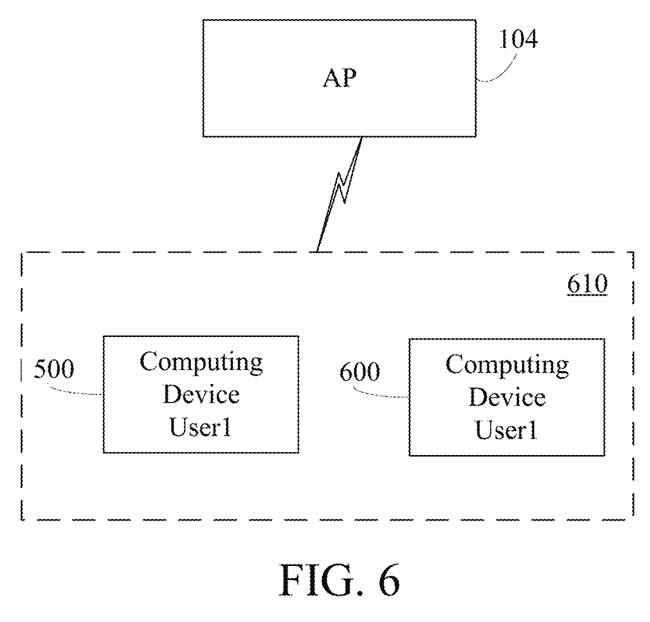
FIG. 6 shows another example of segmented computing devices according to the method of FIG. 4.

In FIG. 6, a computing device 600 requests access to the network 102 via AP 104 (step 410) and the user provides username "USER1" as the identifier. It is determined that the identifier "USER1" is associated with an existing virtual network 510 (step 420). As such, the computing device 600 is connected to virtual network 510 (step 430). Although not shown, the IP address and the MAC address of the computing device 600 are added to the ARP table associated with virtual network 510.

Figure 7:
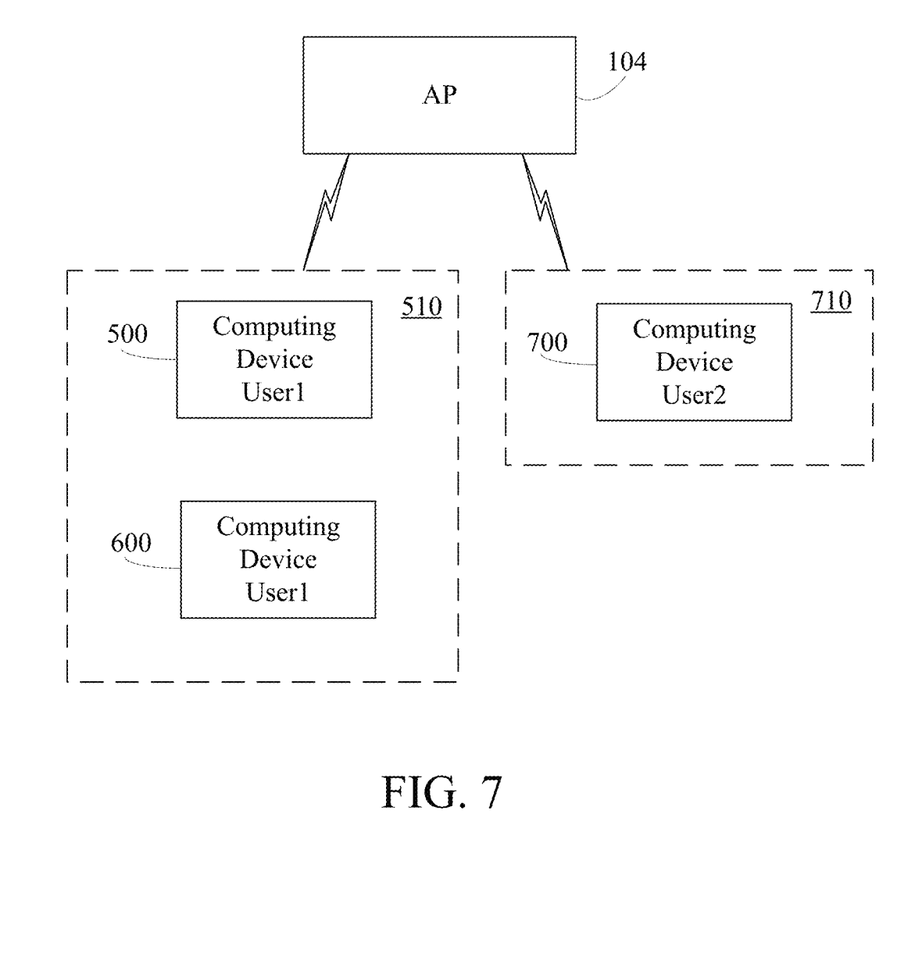
FIG. 7 shows another example of segmented computing devices according to the method of FIG. 4.

In FIG. 7, a computing device 700 requests access to the network 102 (step 410) and the user provides username "USER2" as the identifier. It is determined that the identifier "USER2" is not associated with an existing virtual network (step 420). As such, virtual network 710 is created (step 440) and the computing device 700 is connected thereto (step 450). Although not shown, an ARP table is created by the server 106 for virtual network 710 and the IP address and the MAC address of the computing device 700 are added to the ARP table associated with virtual network 710.

When computing devices are connected to the network 102, the enterprise server 106 together with AP 104 may treat each virtual network as a separate LAN. For example, a broadcast/multicast may be converted to unicast by the AP 104 and communicated to particular virtual networks. Of course, a broadcast/multicast may be communicated by the AP 104 to all virtual networks. As mentioned, Group Temporal Keys (GTKs) may be used. For example, each virtual network may be assigned a particular GTK.

Figure 8:
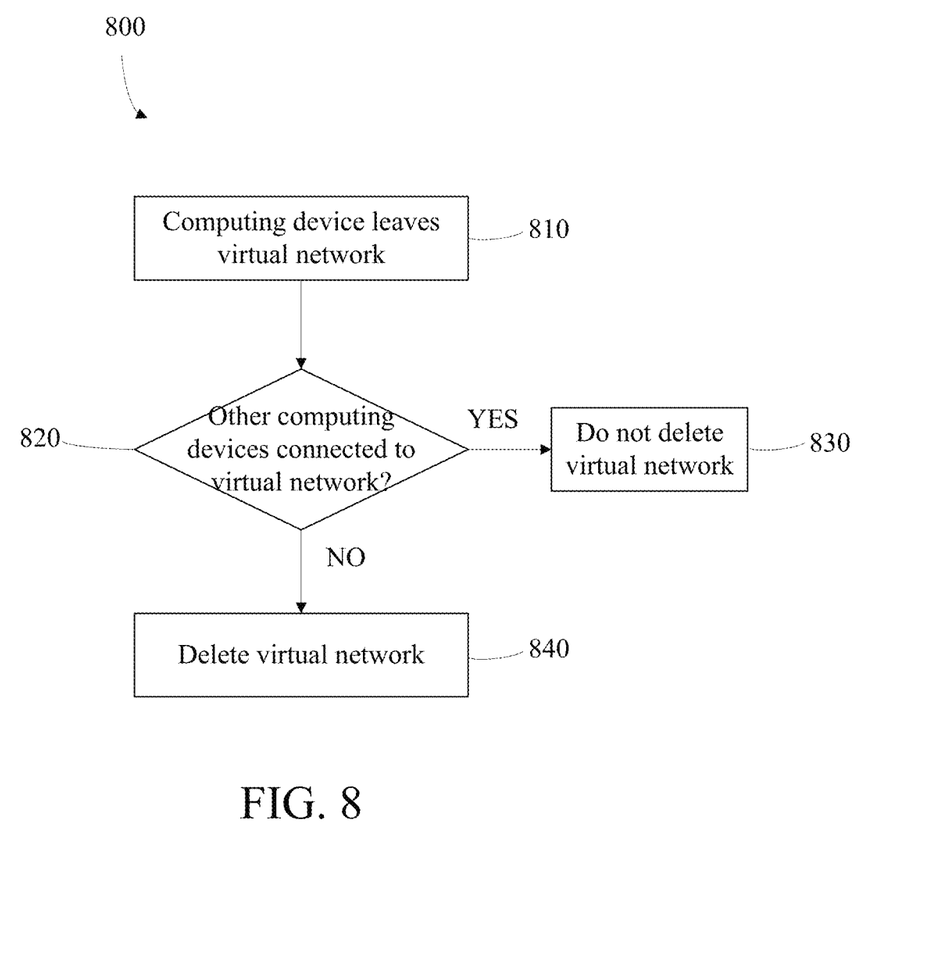
FIG. 8 shows, in flowchart form, one example method for disconnecting a computing device from a network.

Each time a computing device leaves a virtual network, the enterprise server 106 executes a method 800 shown in FIG. 8. During method 800, a computing device leaves or disconnects from a virtual network (step 810). As a result, the computing device is removed from the ARP table of the virtual network. A check is performed to determine if other computing devices are connected to the virtual network being left by the computing device (step 820) and if so, the virtual network is not deleted (step 830). Specifically, the ARP table of the virtual network is not deleted. If, at step 820, there are no other computing devices connected to the virtual network, then the virtual network is deleted (step 840). Specifically, the ARP table of the virtual network is deleted.

In another embodiment of method 800, a time delay may exist before the virtual network is deleted. Further, any parameters or identifiers belonging to the deleted virtual network may be stored or cached in memory for future use. The stored or cached parameters or identifiers may be deleted if they are not used by the network within a certain period of time.

Figure 9:
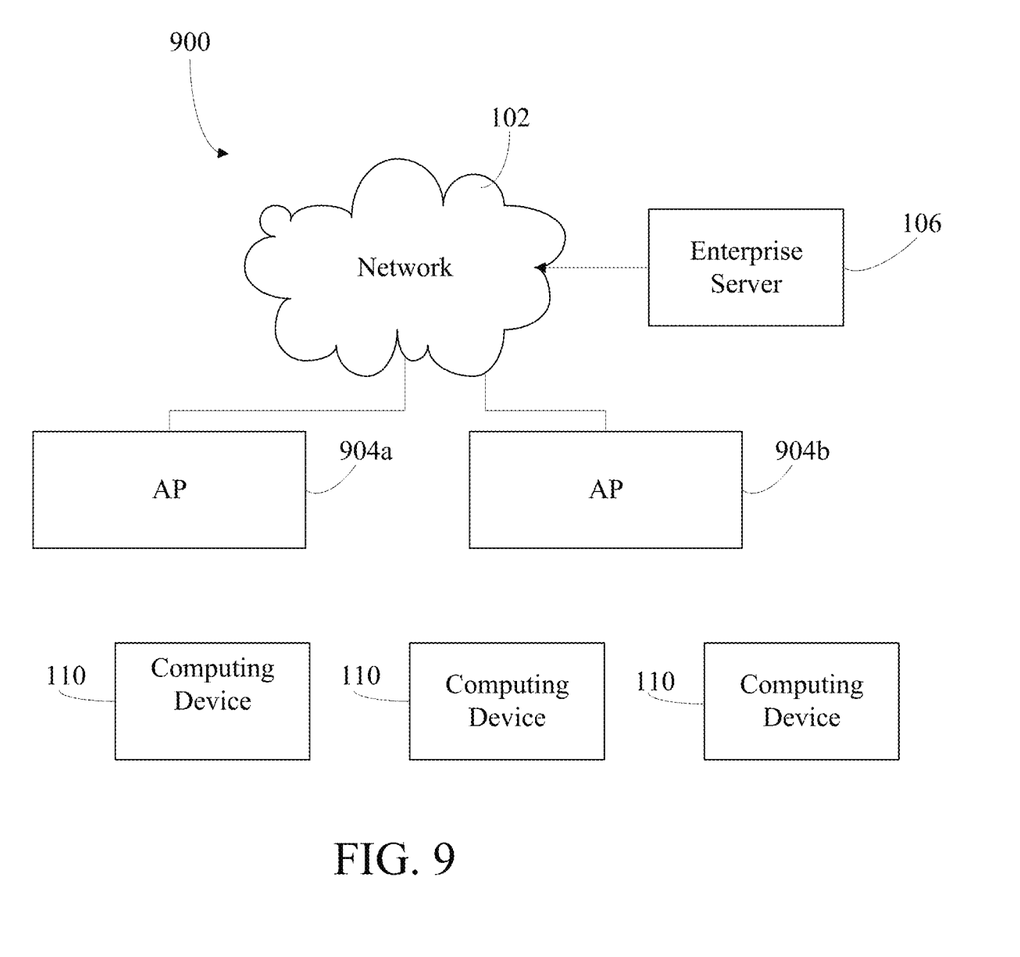
FIG. 9 shows another example system in which methods and devices in accordance with the present description may be implemented.

Those skilled in the art will appreciate that multiple APs may be used. For example, another system is shown in FIG. 9 and is generally identified by reference numeral 900. System 900 is generally identical to system 100 with the following exceptions. In this embodiment, system 900 comprises two APs, namely AP 904a and AP 904b. AP 904a and 904b are similar to AP 104 described above and allow computing devices 110 to join the network 102 via wireless communication. When a computing device 110 joins network 102 and is within range of both AP 904a and 904b, the computing device 110 connects to the network 102 through the AP which provides the strongest connection. Of course, if the computing device 110 is only within range of one of AP 904a and 904b, the computing device 110 will connect to the network 102 through that particular AP. The ARP table of each virtual network may track which AP a computing device is connected to.

Similar to system 100, the enterprise server 106 of system 900 connects computing devices having a common identifier in a virtual network. Each time a computing device requests connection to the network 102 (though either AP 904a or AP 904b), the enterprise server 106 executes method 400.

Figure 10:
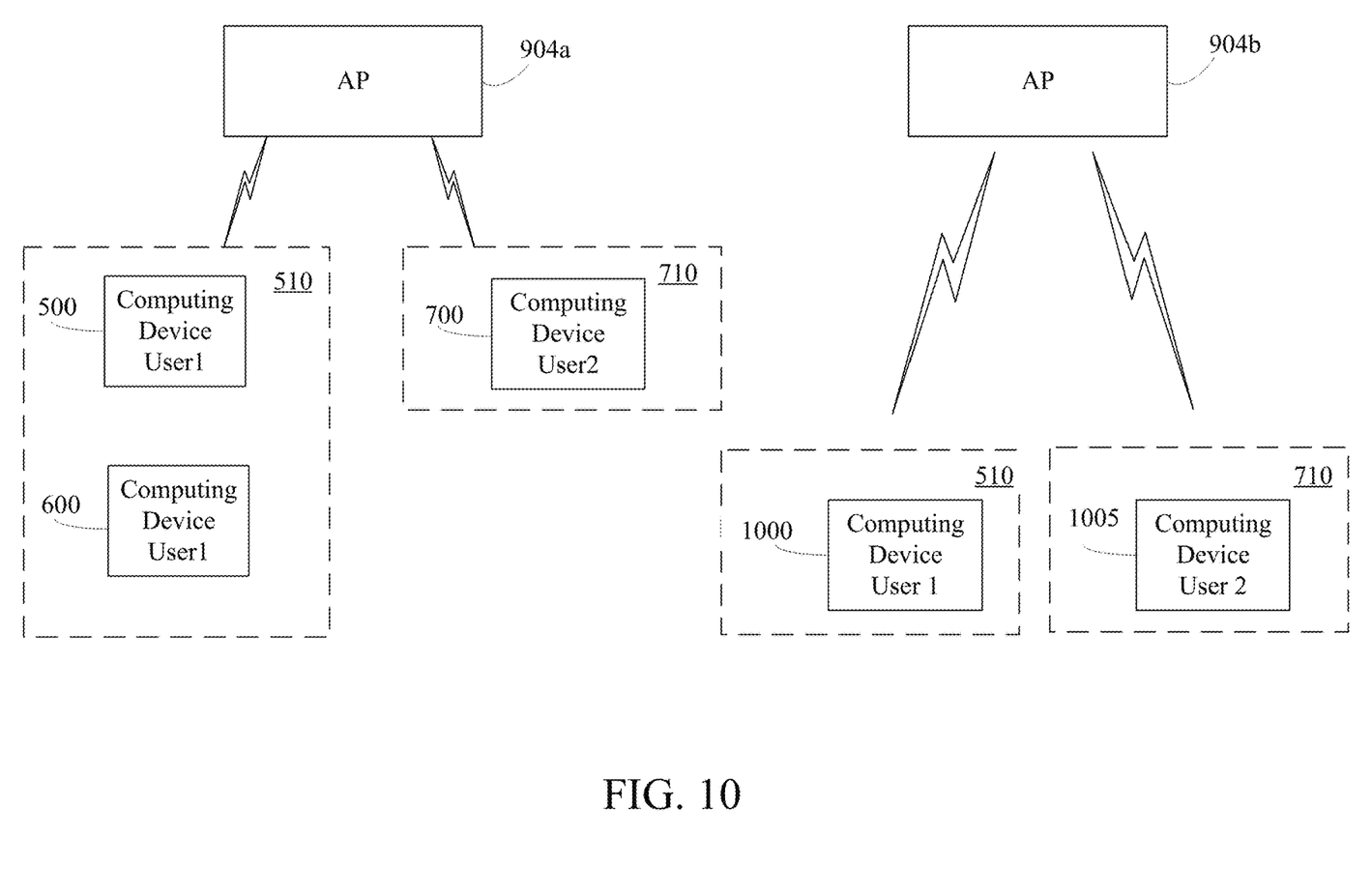
FIG. 10 shows another example of segmenting computing devices according to the method of FIG. 4.

An example of devices connected to the network 102 of system 900 is shown in FIG. 10. As can be seen, computing devices 400, 500 and 1000 are associated with the identifier "USER1" and thus are connected to virtual network 510. Computing devices 400 and 500 are connected to the network through AP 904a and computing device 1000 is connected to the network through AP 904b. Computing devices 700 and 1005 are associated with the identifier "USER2" and thus are connected to virtual network 710. Computing device 700 is connected to the network through AP 904a and computing device 1005 is connected to the network through AP 904b. Although computing devices of the same virtual network are connected through different APs, all computing devices within the virtual network maintain traditional LAN unlimited access to one another. Further, security mechanisms of the virtual network are maintained.

Although in embodiments authentication is described as using EAP, those skilled in the art will appreciate that other suitable authentication protocols may be used such as for example Wi-Fi Protected Access 2 (WPA2), Wi-Fi Protected Access 3 (WPA3), Simultaneous Authentication of Equals (SAE), etc.

Although in embodiments the identifier is described as being the username, those skilled in the art will appreciate that in other embodiments the identifier may be the username and password, the password, a group name, a group password, etc. Other identifiers may be used such as for example a digital certificate, a hardware token, a subscriber identification module (SIM), a public key, an attribute associated with a certificate, or other information associated with an authenticated identity that identifies a user or a group of users. As an example, a user named "Mike" may have multiple devices such as a mobile phone and a laptop. Each device may have its own login information. The mobile phone may require a four (4) digit password to login (or unlock) while the laptop may require a username and password to login (or unlock). To connect the two devices to the same virtual network, a credential attribute may be used and may have a name such as "Mike's Stuff."

It will be appreciated that the various methods described above are presented in flowchart form to show a sequence of operations for ease of illustration and discussion, but that in some implementations a different sequence of operations may be used, additional operations may be included, and/or some operations shown sequentially may occur simultaneously or in parallel, without changing the substance of the processes.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of segmenting computing devices in a wireless network having an access point broadcasting in a single broadcast domain, the method comprising:
   receiving, from a first computing device, a request to join the wireless network, the request associated with an identifier;
   determining that the identifier is not associated with an existing virtual network within the wireless network;
   responsive to determining that the identifier is not associated with the existing virtual network within the wireless network, configuring a virtual network within the wireless network and associating the identifier thereto;
   creating an address resolution protocol table associated with the virtual network; and
   assigning the first computing device to the virtual network by adding an address of the first computing device to the address resolution protocol table associated with the virtual network.

2. The method of claim 1, wherein the address of the first computing device includes at least one of an internet protocol address or a medium access control address, and wherein the identifier is at least one of a username, a password, a group name, a group password, a digital certificate, a hardware token, a subscriber identification module, a public key and an attribute associated with a certificate.

3. The method of claim 1, further comprising:
   receiving, from a second computing device, a request to join the wireless network, the request associated with the identifier; and
   assigning the second computing device to the virtual network by adding an address of the second computing device to the address resolution protocol table associated with the virtual network.

4. The method of claim 1, further comprising:
   determining that the first computing device has left the wireless network; and
   removing the first computing device from the virtual network by removing the address of the first computing device from the address resolution protocol table associated with the virtual network.

5. The method of claim 1, further comprising:
   determining that the first computing device is the last computing device of the virtual network to leave the wireless network; and
   deleting the virtual network.

6. The method of claim 1, wherein all computing devices within the virtual network have at least one of unrestricted communication with one another and unlimited access to one another.

7. The method of claim 1 wherein each virtual network within the wireless network comprises a broadcast domain enforcement layer such that a computing device assigned to the virtual network can access only other computing devices assigned to the same virtual network.

8. The method of claim 1, wherein each virtual network within the wireless network comprises an internet protocol broadcast domain enforcement layer such that when an internet protocol packet is received and includes an address outside the virtual network, the internet protocol packet is transmitted to the address outside the virtual network.

9. The method of claim 1, wherein each virtual network within the wireless network comprises at least one of a network level service and a firewall layer, wherein the at least one of the network level service and the firewall layer are configured to be recognized and accessed by the assigned computing device as another computing device assigned to the virtual network.

10. A server associated with a wireless network, the server comprising:
    a processor;
    a memory; and
    processor-executable instructions that, when executed by the processor, cause the processor to:
      receive, from a first computing device, a request to join the wireless network, the request associated with an identifier;
      determine that the identifier is not associated with an existing virtual network within the wireless network;
      responsive to determining that the identifier is not associated with the existing virtual network within the wireless network, configure a virtual network within the wireless network and associate the identifier thereto;
      create an address resolution protocol table associated with the virtual network; and
      assign the first computing device to the virtual network by adding an address of the first computing device to the address resolution protocol table associated with the virtual network.

11. The server of claim 10, wherein the address of the first computing device includes at least one of an internet protocol address or a medium access control address, and wherein the identifier is at least one of a username, a password, a group name, a group password, a digital certificate, a hardware token, a subscriber identification module, a public key and an attribute associated with a certificate.

12. The server of claim 10, wherein the processor-executable instructions, when executed by the processor, further cause the processor to:
    receive, from a second computing device, a request to join the wireless network, the request associated with the identifier; and assign the second computing device to the virtual network by adding an address of the second computing device to the address resolution protocol table associated with the virtual network.

13. The server of claim 10, wherein the processor-executable instructions, when executed by the processor, further cause the processor to:
    determine that the first computing device has left the wireless network; and
    remove the first computing device from the virtual network by removing the address of the first computing device from the address resolution protocol table associated with the virtual network.

14. The server of claim 10, wherein the processor-executable instructions, when executed by the processor, further cause the processor to:
    determine that the first computing device is the last computing device of the virtual network to leave the wireless network; and
    delete the virtual network.

15. The server of claim 10, wherein computing devices within the virtual network have at least one of unrestricted communication with one another and unlimited access to one another.

16. The server of claim 10, wherein each virtual network within the wireless network comprises a broadcast domain enforcement layer such that a computing device assigned to the virtual network can access only other computing devices assigned to the same virtual network.

17. The server of claim 10, wherein each virtual network within the wireless network comprises an internet protocol broadcast domain enforcement layer such that when an internet protocol packet is received and includes an address outside the virtual network, the internet protocol packet is transmitted to the address outside the virtual network.

18. A non-transitory computer readable medium having stored thereon processor-executable instructions that, when executed by the processor, cause the processor to:
    receive, from a first computing device, a request to join the wireless network, the request associated with an identifier;
    determine that the identifier is not associated with an existing virtual network within the wireless network;
    responsive to determining that the identifier is not associated with the existing virtual network within the wireless network, configure a virtual network within the wireless network and associate the identifier thereto;
    create an address resolution protocol table associated with the virtual network; and
    assign the first computing device to the virtual network by adding an address of the first computing device to the address resolution protocol table associated with the virtual network.

* * * * *